(12) United States Patent  (10) Patent No.: US 6,722,801 B2
Snape                         (45) Date of Patent:     Apr. 20, 2004

(54) DIGITAL PRESS

(75) Inventor: Timothy Snape, Abbotsbury (GB)

(73) Assignee: Winslow, Inc., Navarre, OH (US)

( * ) Notice: Subject to any disclaimer, the term of this patent is extended or adjusted under 35 U.S.C. 154(b) by 0 days.

(21) Appl. No.: 10/205,000

(22) PCT Filed: Feb. 26, 2001

(86) PCT No.: PCT/US01/06205

§ 371 (c)(1), (2), (4) Date: Aug. 23, 2002

(87) PCT Pub. No.: WO01/63551

PCT Pub. Date: Aug. 30, 2001

(65) Prior Publication Data

US 2003/0016979 A1 Jan. 23, 2003

(51) Int. Cl.[7] ................................................. B41J 11/44

(52) U.S. Cl. ............................... 400/76; 400/61; 400/70
(58) Field of Search ............................... 400/61, 70, 76

(56) References Cited

U.S. PATENT DOCUMENTS

RE30,942 E  *  5/1982  Takenaka ................. 400/154.2
6,168,333 B1 *  1/2001  Merz et al. ................. 400/634
6,312,099 B1 * 11/2001  Hawkins et al. ............. 347/42

* cited by examiner

*Primary Examiner*—Charles H Nolan, Jr.
(74) *Attorney, Agent, or Firm*—Fay, Sharpe, Fagan, Minnich & McKee, LLP

(57) ABSTRACT

A control device manages an electronically actuated device for the purpose of ejecting liquids onto a substrate in a controlled manner.

16 Claims, 8 Drawing Sheets

DIGITAL PRESS

BACKGROUND OF THE INVENTION

Conventional digital printers are designed for an office printer market. Using digital printers for volume/industrial printing is new. The volume/industrial printing market has different requirements than the office market. Some of the features required from an industrial printer include printing the same image repeatedly; printing an image at a high rate of speed; being able to incorporate elements in the print image that changes (i.e. a barcode or other quality control marks); being able to describe regions where no printing is to take place; high reliability; minimizing ink wastage; and maximizing overall productivity of the print production process.

How well these requirements are met affects commercial cost of operating the industrial printer to produce a finished product. This invention provides a device that can used in a printing system to satisfy these requirements and that will allow for the commercial development of a digital press.

Conventional printing presses typically use a mirror image impression of a required print out. This impression is combined with a printing fluid and is then "pressed onto" a substrate to produce a desired printout. This process has the advantage of speed; presses can be created that produce printouts at a rate limited only by the mechanical operations required to physically press an impression onto a substrate.

To be of value in the volume/industrial printers marketplace a digital press has to offer print speeds that are comparable to those of conventional printing presses. One way a digital press can match the speed of a conventional printing press is to use many print heads in parallel.

BRIEF SUMMARY OF THE INVENTION

This application discloses a control device that can be used in conjunction with any type of electronic printhead to create a printing system that is optimally fast and can be extended to support an unlimited number of printheads, thus allowing the device to print onto any size, shape or type of media and at speeds comparable to conventional presses that already exist in the marketplace.

One advantage that digital presses offer over conventional presses is that of digital control over the images being printed. This offers the operator flexibility to manage the image in a number of beneficial ways. The image may be modified digitally between each print out. This allows the operator to customize each printout with specific information, such as quality control marks. With conventional presses this facility can only be achieved by providing additional printing stages to the printing process. This adds to cost and production times.

A second advantage that digital presses offer over conventional presses is that setup and changeover time is reduced. When using a conventional press, the image impression has to be created and placed upon the printing press. The creation time for an impression may be several days or weeks. Once the impression has been created the time required to remove the previous impression from a press and replace it with the new impression is many minutes and can be more than an hour. The economics of printing operations using conventional presses is that it is usually uneconomic to do print runs of less than 5,000 items. With a digital press, no physical impressions are used. This reduces the image creation cost and removes the overhead of setting up a press. As a result print runs of one item are economic, this is beneficial as it reduces printing costs, it reduces lead times required to set up a print run, and it reduces waste.

Still other benefits and advantages will become apparent to one skilled in the art upon reading and understanding the following detailed description.

BRIEF DESCRIPTION OF THE DRAWINGS

The invention may take form in various components and arrangements of components. The drawings are only for the purposes of illustrating preferred embodiments and are not to be construed as limiting the invention.

DETAILED DESCRIPTION OF THE INVENTION

Figure 1:
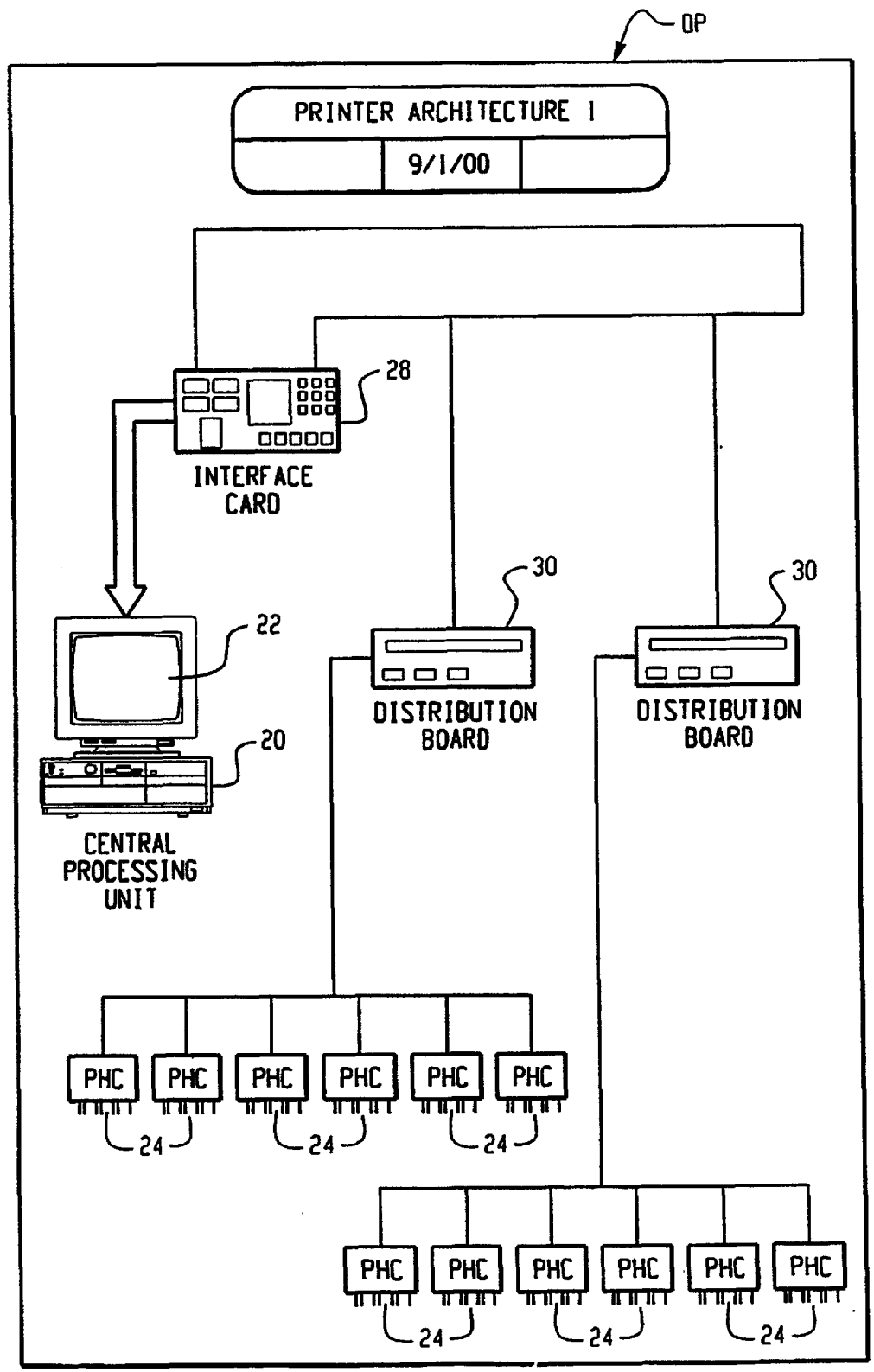
FIG. 1 is a schematic representation of the printer architecture.

This invention describes a print head controller (PHC) device that can be used in conjunction with a digital print head (as exist in the marketplace) to create a single printing element. In the manufacture of a complete printing system, many of these printing elements are used together to form a digital press DP. Each one of the printing elements interacts with a controlling computer to produce a printout, in synchrony with all the other printing elements used in the printer.

The external controlling computer system 20 provides an operator with a user interface 22 (touchscreen, keyboard, mouse, etc.) to operate the digital press. It also supplies the digital press with digital images to print. A raster image processor (RIP) will rasterise an image (however it is represented) into strips of digital data. This rasterization process is a well known by people skilled in the art. These strips of digital data represent swathes through the original image that have been color transformed so that when the digital press prints these swathes of image, they are combined together to recreate the original image in a way that is aesthetically and commercially acceptable.

Each one of these digital strips of data is transferred digitally to a separate PHC 24 of a printer element 26. The PHC stores this digital information in its computer memory. This computer memory may be of any type of electronic storage medium but typically it is RAM (random access memory) storage. In the preferred arrangement, each PHC contains all the logic for driving individual print heads. It also contains buffers for storing data that is to be used for printing. Each PHC unit is responsible for controlling one print head. Each PHC communicates with its associated distribution board. The PHC stores the image that is being printed and commands or drives its associated print head to produce an output.

The PHC has a very simple data bus. Data is sent to and from the PHC using this high speed, parallel bus. It is possible to send and query a number of registers in the PHC. It is also possible to read and write data into the PHC's RAM. Each PHC has its own region of RAM, typically 1 MB; however, the region may be as much as 4 GB depending upon the configuration.

The PHC in a preferred arrangement has three (3) registers that are used to associate the RAM with the PHC. A first register is referred to as a current register that contains the current read/write address. Any read or write operations address the memory indexed by this register. Adding one to this register has the effect of advancing the current read/write address by one byte. Reading or writing to the RAM also causes the current register to be advanced by one.

A second register, or end register, describes the end of a region of memory. When the current register is set to the same value as the end register, then it will be set to the value of the start register.

A third register, or start register, describes the start of a region of memory.

Once the strip of image data is stored by the PHC, it is ready to use the contents of this data to drive its associated print head. The result is that each print element produces a strip of the original image as printout.

In order to ensure that all the printheads print out in sequence with each other, a control signal is sent to each and every one of the PHCs 24 via the central processing unit 20, interface card 28, and distribution boards 30 (FIG. 1). This control signal, which may be actuated electro-mechanically or in software, starts a sequence of operations on each and every PHC receiving the control signal. The result of this signal being activated is to cause a single line of print out to be generated by each PHC. Each distribution board controls a number of PHCs and each PHC is responsible for controlling one print head. By way of example only, each interface card can control up to two hundred fifty four distribution boards and each distribution board can control up to two hundred fifty four PHCs. The interface card is a relatively simple board that is installed into the controlling computer system 20. It allows the software of the computer system to communicate with the rest of the printer system. It preferably has two 50-way parallel bus connectors; namely, an output connector for sending all commands and data and an input connector for receiving all data. Everything output on the output connector will be echoed on the input connector. Using two connectors allows the software to monitor the integrity of the bus. The printer system preferably supports a bi-directional serial bus that allows an operator/user to interrogate the system. The operator/user can attach a separate PC, for example, through a suitable connector for diagnostic purposes.

Figure 2:
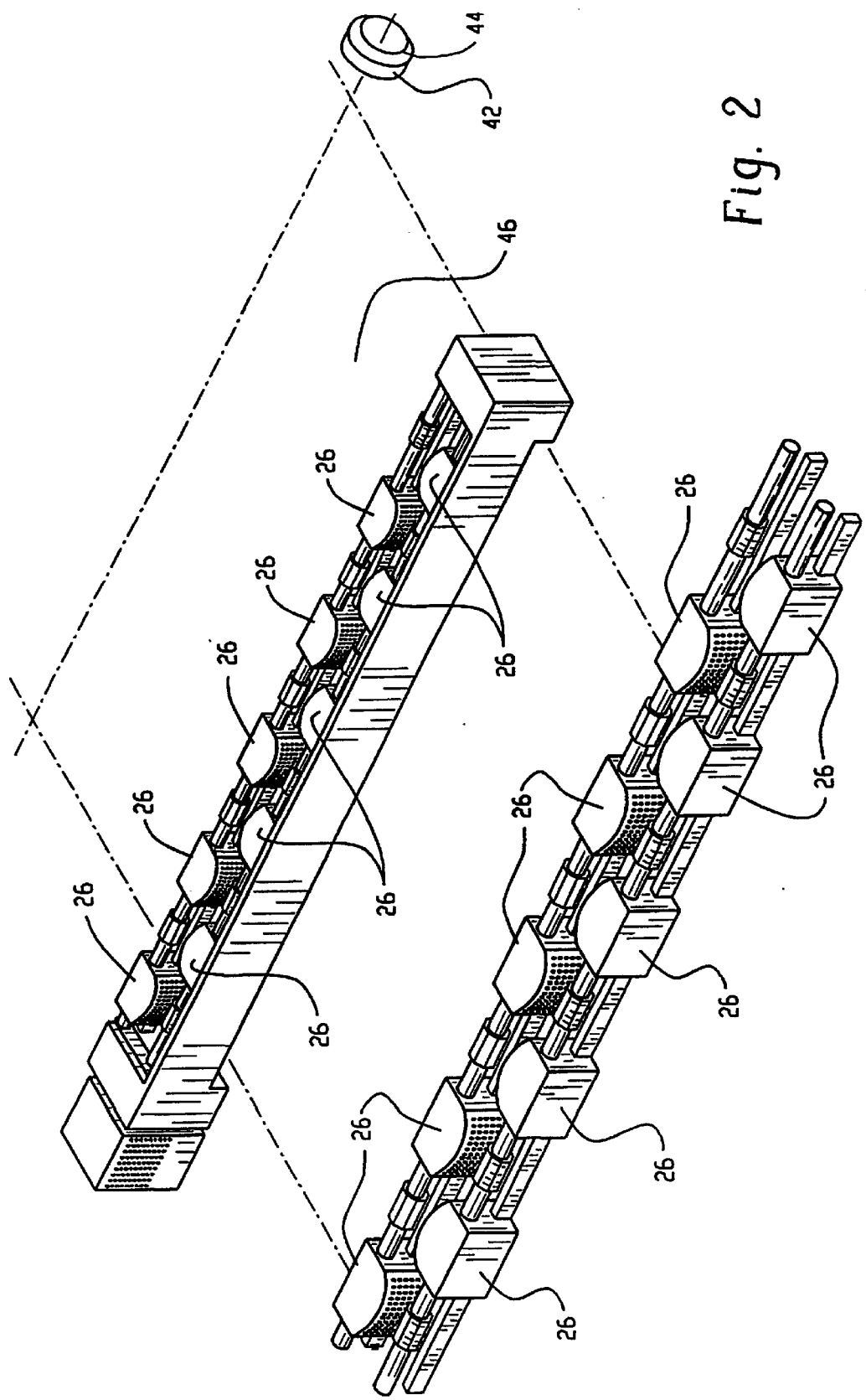
FIG. 2 is a perspective view of a pair of print bars in accordance with the present invention.

One possible, but not limiting, arrangement for generating this signal is to use a digital rotary encoder 40 positioned on a carriage feed 42 of a substrate 44 (FIG. 2). To activate the printing process the substrate is moved. This movement activates the rotary encoder 40 to generate a pulse train. This pulse train results in the control signal being generated and triggering the PHC to drive the print head. This has the advantage that it keeps the digital press printout in register with the substrate onto which it is printing.

A second possible, but not limiting, arrangement for generating this signal is to use a digital stepper motor 46 represented in phantom in FIG. 2 to drive the carriage feed of the substrate. The control signals used to drive the stepper motor also generate the control signals required to drive the PHC. This also has the advantage that it keeps the digital press printout in register with the substrate onto which it is printing.

Other print triggering and substrate moving mechanisms may be employed or combinations of these mechanisms. These are well known by practitioners in this field.

By carefully aligning the individual printheads it is possible to arrange the separate strips of printout so they are aligned with each other seamlessly. The overall effect is to generate a printout with all the strips of data combined, such that the resultant image on the substrate is acceptable in the marketplace.

When using large arrays of print heads the alignment of the individual print heads across the width of the array is critical. If each print head is positioned independently it can involve a lot of adjustment to attain the desired alignment. Similarly, once the print heads for one color have been aligned, getting the correct registration for multiple colors can be extremely difficult.

An apparatus 50 and method for arranging print heads so they are easy to align precisely is provided by the present invention and examples are illustrated in FIGS. 3–7.

A first print head 52a is preferably fixed to a rigid attachment 54. The first head is connected to the second head 52b by means of an adjusting member 58 such as a strutted screw arrangement or turnbuckle. Turning the screw has the effect of either ringing adjacent print heads closer together or pushing them further apart. Once the distance between the heads is correct, the screw is locked in place and holds the two heads rigidly and precisely in place. In turn, the second print head 52b can be attached to another print head by a similar screw arrangement. Turning the screw will have the same effect as for the first print head and the second print head.

The important point to note is that the head attachment point is fixed so that it will never move. All the other heads are on flexible sliders. When the screw between the first head and the second head is turned, the first head remains fixed and the second head slides. All the other heads after the second head also slide. Because all the other heads are held rigidly apart via their turnbuckles and adjacent heads, they retain their spacing between each other.

Figure 6:
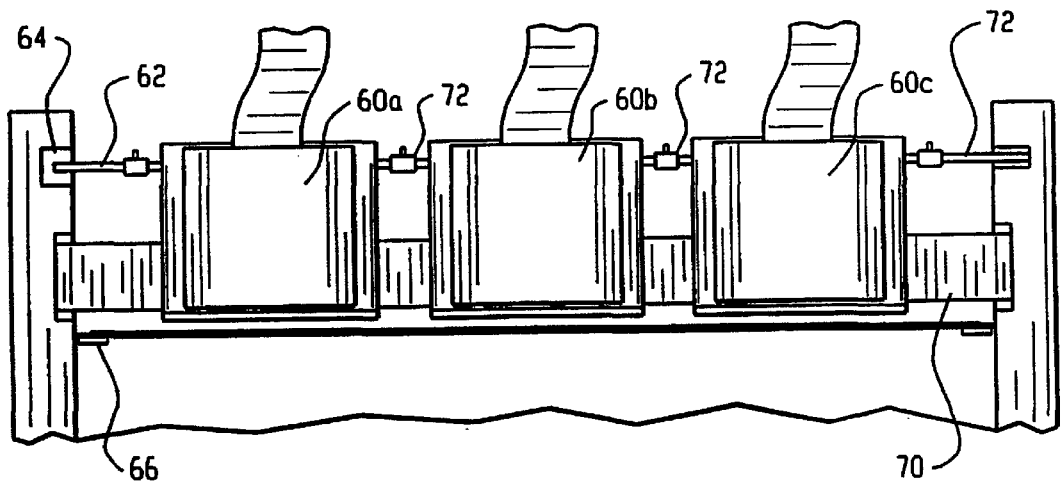
FIG. 6 is an elevational view of another preferred embodiment of a print bar.
Figure 7:
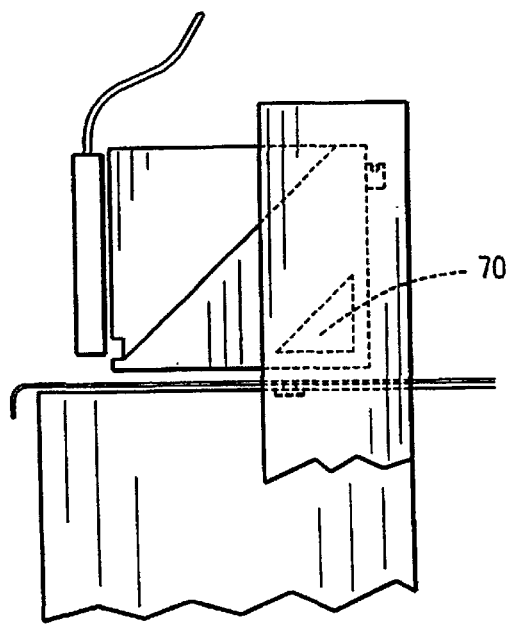
FIG. 7 is an end view of the print bar of FIG. 6.
Figure 8:
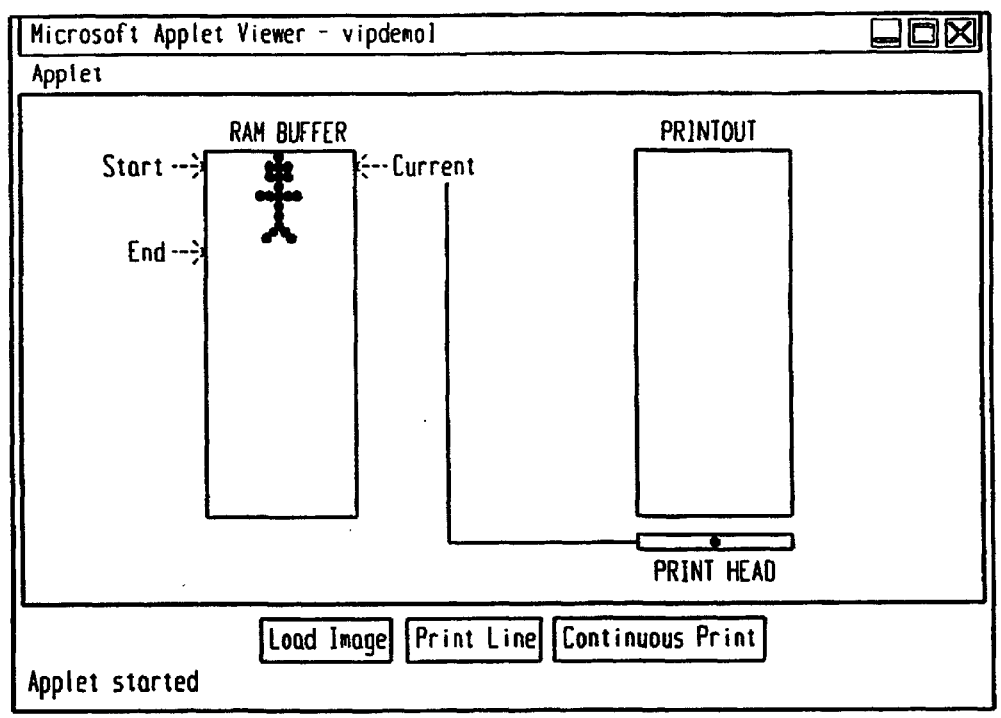
FIG. 8 shows the print head initialized with an image (a stick man), and the print head ready to print the first line of pixels.
Figure 9:
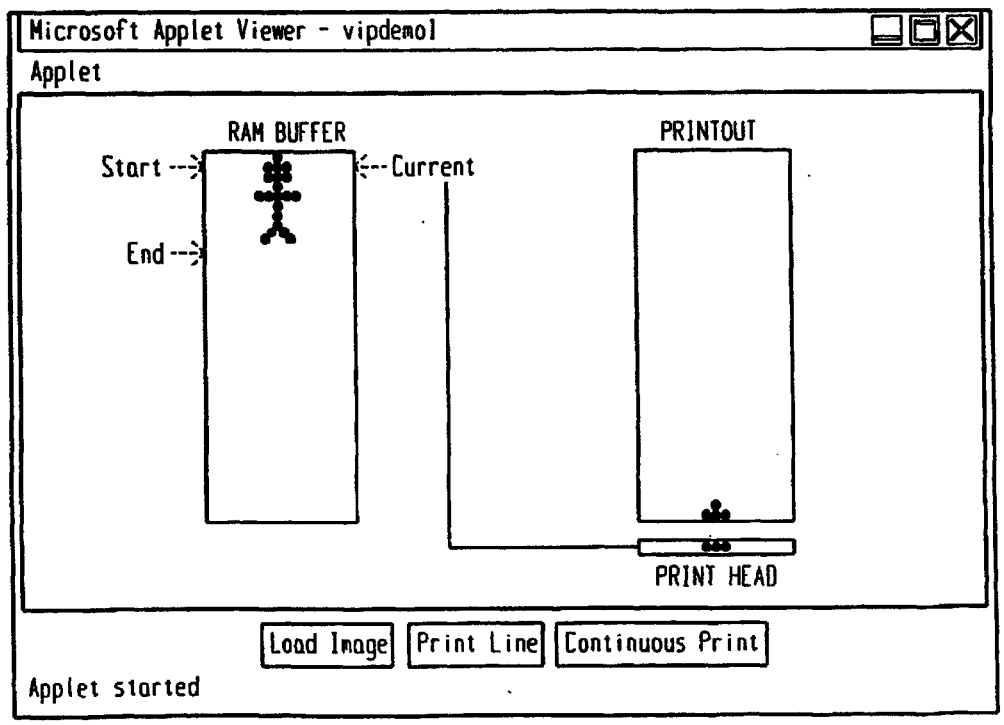
FIG. 9 shows the print head after the second row of pixels has been printed.
Figure 10:
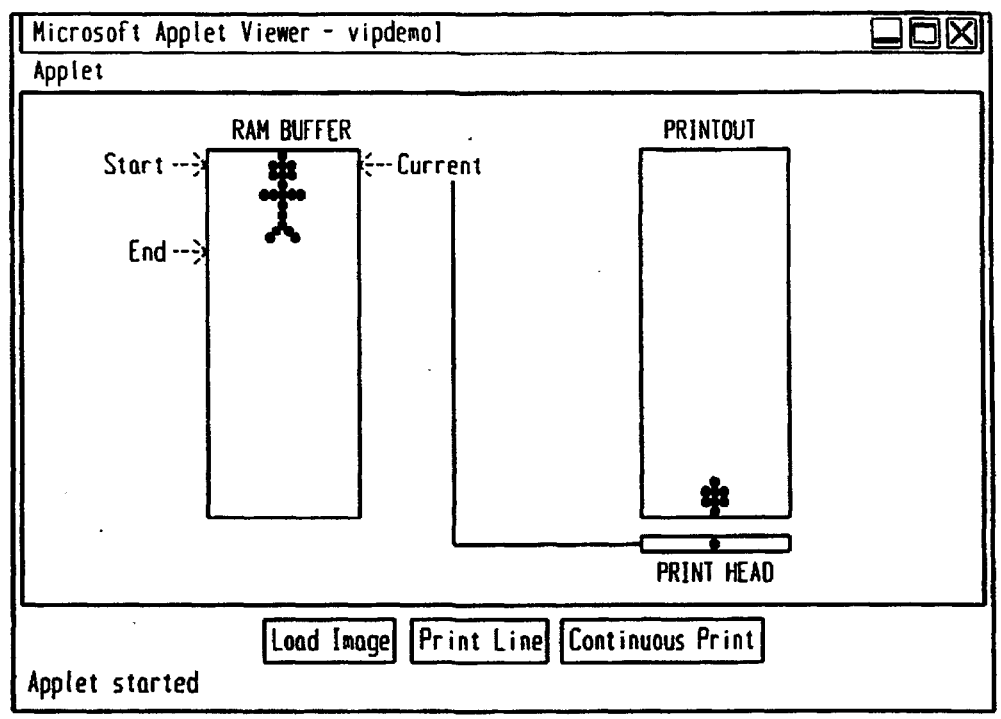
FIG. 10 shows the print head after additional printing has occurred.
Figure 11:
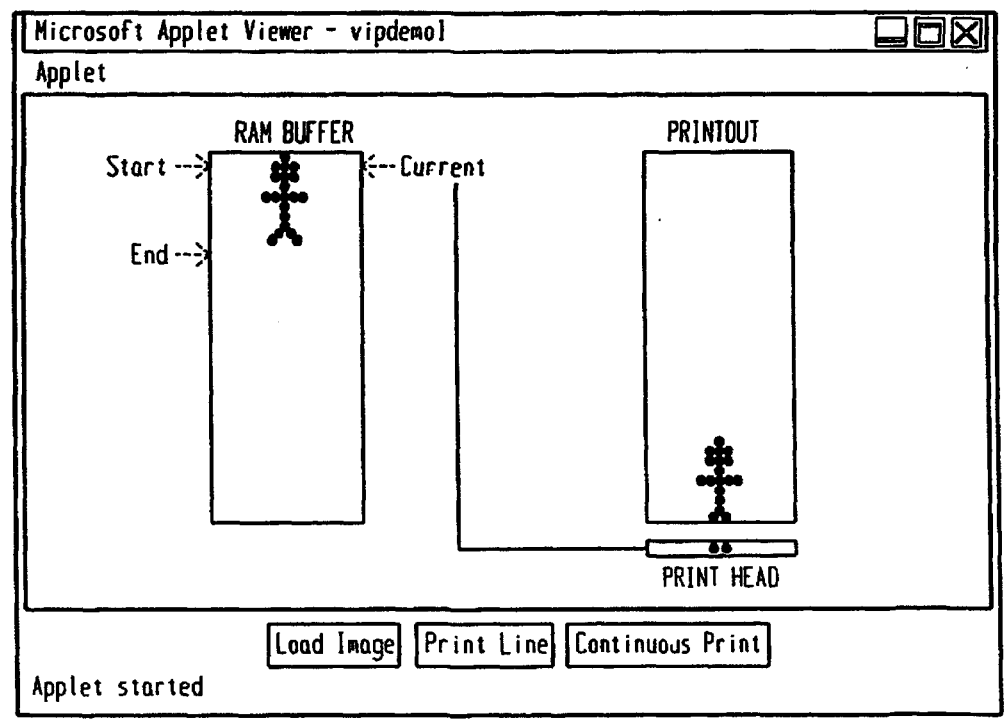
FIG. 11 shows the printhead after still further printing from that illustrated in FIG. 10.
Figure 12:
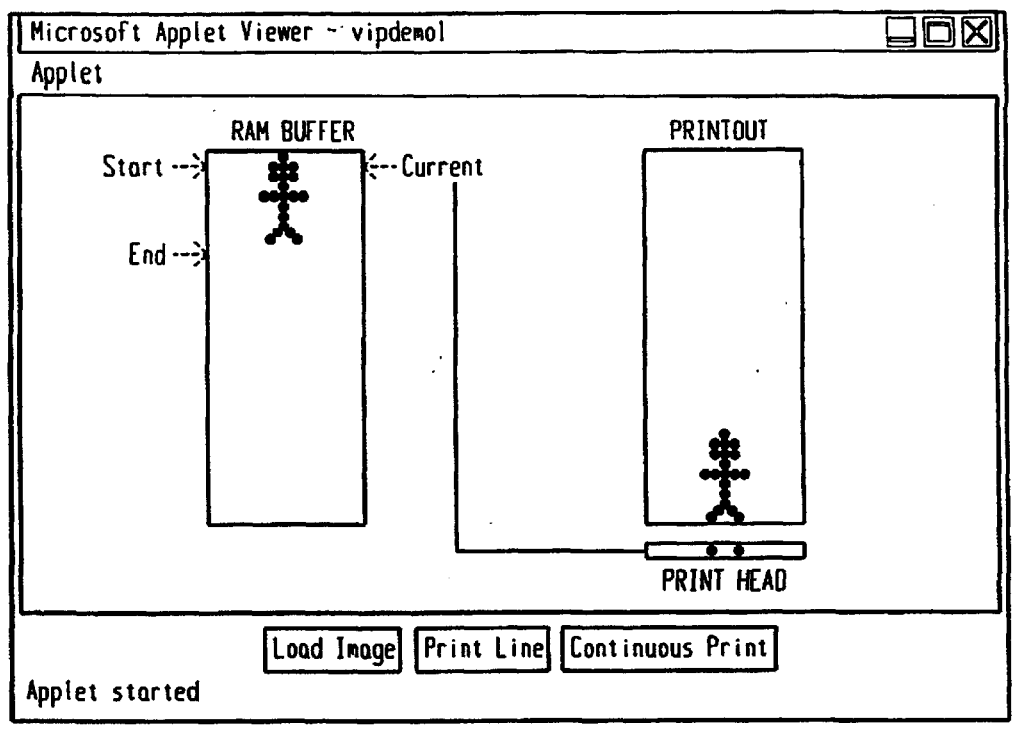
FIG. 12 illustrates the last row of pixels having been printed and a current register about to be set to wrap round to a start address
Figure 13:
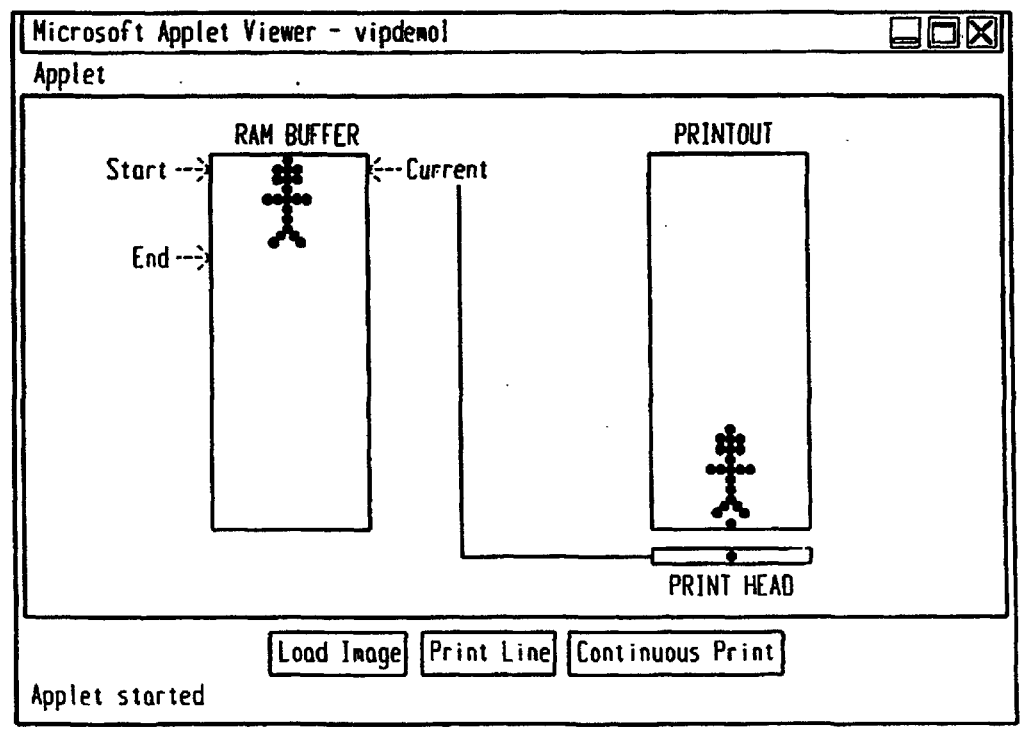
FIG. 13 illustrates printing the first line of pixels of the second image.
Figure 14:
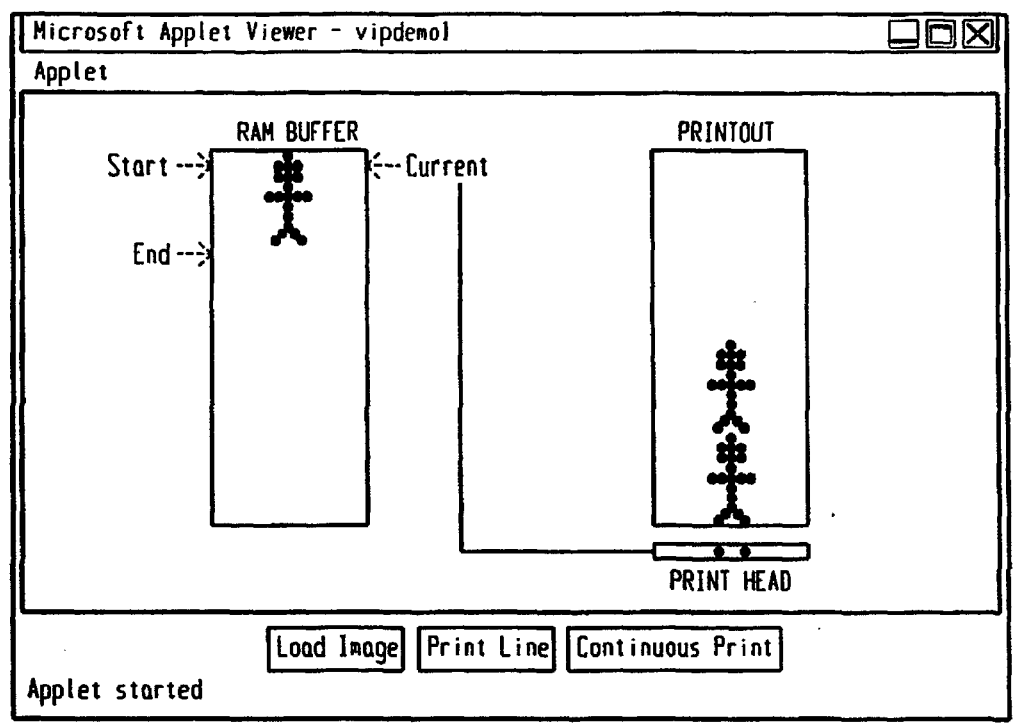
FIG. 14 illustrates the last row of pixels being printed for the second complete image.
Figure 15:
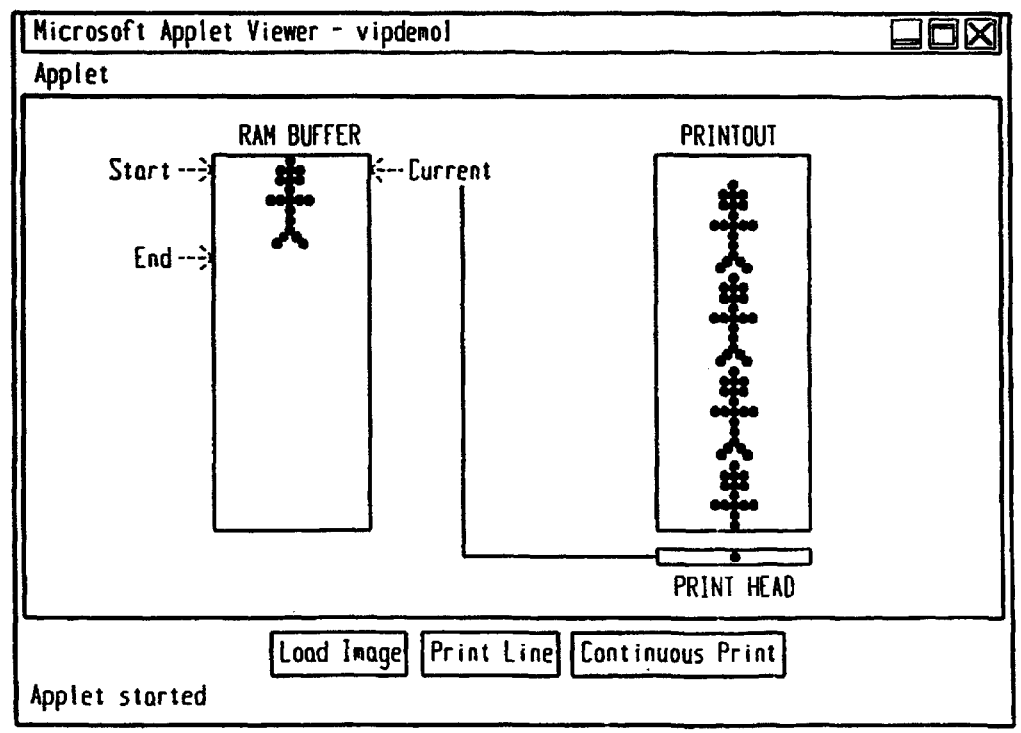
FIG. 15 shows three complete images having been printed and the Current register is about to output the ninth row of pixels.

A further extension of this invention allows for dynamic realignment of the heads and is more particularly illustrated in FIGS. 6 and 7.

If a first print head 60a is attached via its strut 62 to a ram device 64, the ram device can, under external control, cause the entire row of heads 60a, 60b, 60c, etc. to be dynamically realigned. It is envisaged that the ram device can be made from a piezo ceramic material that can vary its shape using an input voltage.

A sensing mechanism 66 determines the position of the substrate 46. This sensing mechanism could detect the edge of the substrate material or some feature incorporated into it (such as a printed line). Depending on the position of the substrate, the ram device is actuated to reposition the entire row of heads such that it is in register with the paper.

Figure 5:
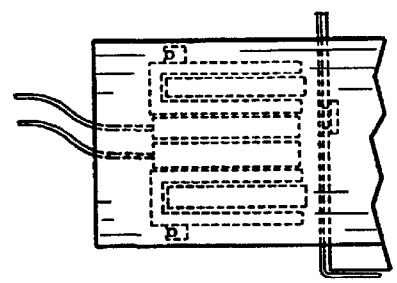
FIG. 5 is an end view of the print bar of FIG. 3.
Figure 4:
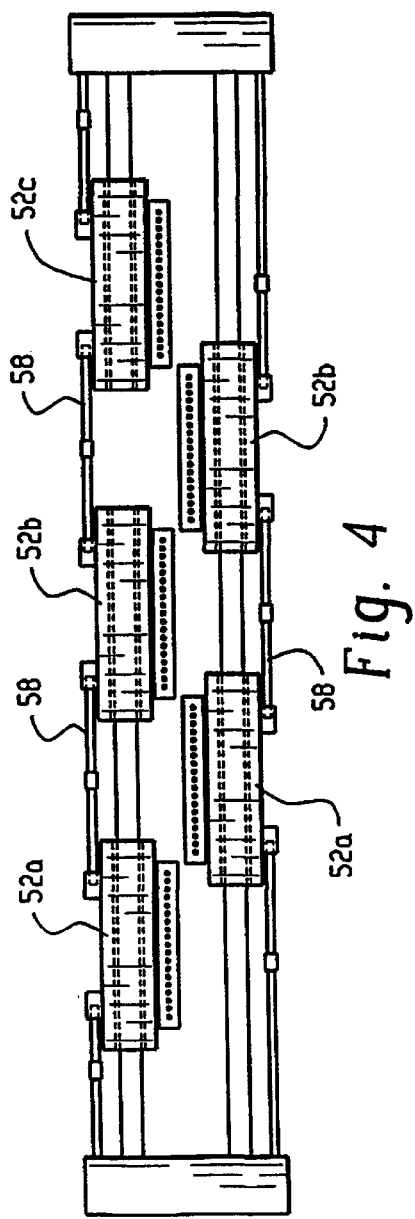
FIG. 4 is a plan view of the print bar of FIG. 3.
Figure 3:
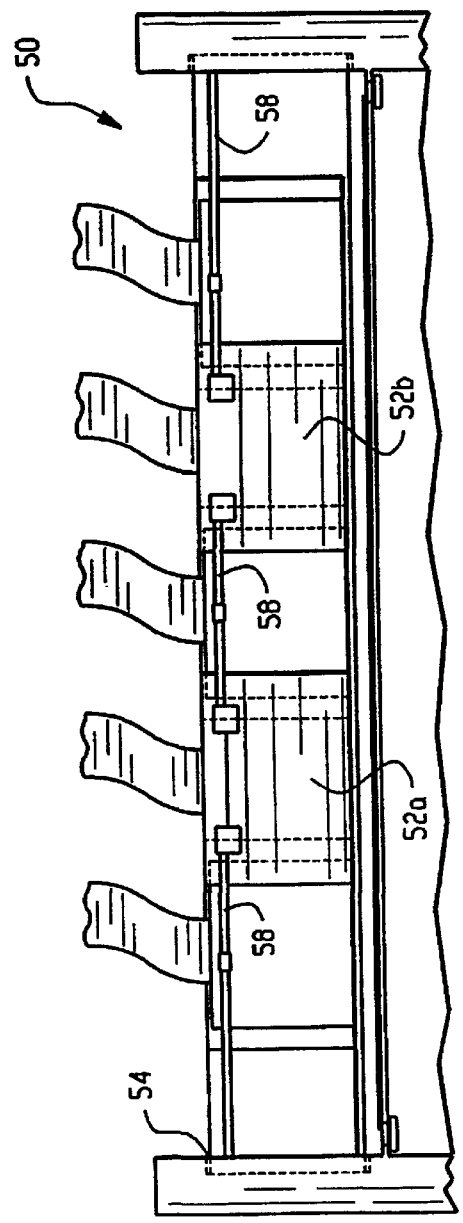
FIG. 3 is an elevational view of the preferred embodiment of a print bar.

A further extension of the invention allows for more than one row of heads to be arranged together (FIGS. 3–5). For example, two rows of heads could be used. The heads would be positioned to maximize the accuracy of the alignment. It is envisaged that an optimal solution could be where the heads are positioned opposite each other, as illustrated. The advantage of this arrangement is that it minimizes the distance between adjacent heads. This, in turn, minimizes any misalignment errors caused by lateral movements of the substrate being printed upon.

By way of example, FIG. 6 shows an anterior view of three print heads mounted on a triangular sliding beam 70, connected by rods 72 with turnbuckles. FIG. 7 shows a side view of the same print heads. When the sensor 66 senses the position of the paper, that information is supplied to a control box. The control box will actuate the piezo ceramic ram to cause the entire row of print heads attached to the piezo ceramic ram to be displaced by the same amount as the paper edge. This will have the effect of keeping the output aligned precisely to a paper edge.

The print head is mounted onto a sliding shoe. The shoes are placed onto the fixed bar. The turnbuckle assemblies are attached to the shoe. The turnbuckle is then extended or shortened to align the adjacent heads precisely. Once in place, it is envisaged that a fixing device will be used to hold the entire arrangement rigidly.

All of the print heads and electronics to control the print heads are mounted onto print bars PB. Each print bar PB prints a single color. As the print substrate passes underneath the print bar it prints. The operator has flexibility in the number of print bars used. For single color printing, a single print bar is sufficient For eight color printing, eight print bars would be required. The print bars provide the structure on which the individual print heads may be mounted. Due to the shape of the print heads they cannot just be mounted in a single row because there would be large gaps between them. The print bars have other useful features. The print head can be positioned very accurately. The print bars contain a mechanism that allow each individual print head to be precisely located. They are mounted on a device that allows each bar to be dynamically positioned and kept in register with the substrate it is printing onto. They are physical units that may be easily installed and replaced. In the event of any problem, an end user can easily replace the entire print bar unit.

The mounting arrangement for each print head preferably has two elements, a removable device that the print heads are attached to and a fixed mount attached to the print bar. These two elements allow the user to mount the head on the removable device, which can be clipped onto the fixed mount. Electrical connections and the ink feed supply are also attached to these acceptor devices.

The mounting devices are attached onto a slider on the print bar. In the attached diagram, the slide is shown as a triangular bar. Once attached, the mounting devices can be slide along the slider. This allows each print head to be accurately positioned. Once the mounting device is in the correction position on the print bar it is held in place by a rigid strut that it attached to its neighboring mounting device. Once locked in place the struts will hold each mounting device rigidly in place. At one end of the print bar the strut will be attached to the frame of the print bar.

Each strut can have its length varied since one end of the mounting device is held rigidly in place and the other is not as described above. Varying the length in a single strut will cause all the mounting devices on one side to be repositioned. This is very important as it allows for one head to be accurately positioned without the need to realign all the other heads with respect to this new alignment.

With respect to the print control, each print element has sufficient computer memory to retain a copy of a part of the image it is responsible for printing. By retaining this image in the PHC, it allows the image stored to be used for the next print cycle. This allows the printer to print repeating images and thus the reason for referring to this assembly as a digital press.

The images to be printed are stored in the PHC's memory storage. Additional information relating to the image is also be stored in this memory or a separate memory bank. This additional information instructs the PHC how to perform its functions.

As well as image data, there are registers that hold values. These registers may be queried and set and affect the printing operations.

The instructions will execute like a conventional computer program. The clock that causes each instruction to be invoked is generated by the action of the print substrate moving. One instruction is performed for each print line of movement.

An instruction set (set of instructions supported by a computer processor chip) of this system is limited to a small set of instructions as are appropriate for a system of this kind.

Instructions access register values and affect the way some operations take place. These instructions may include (but are not limited to):

"Print a line of pixels" using some data held in the PHC memory. The print instruction is associated with a line of pixel image data. This instruction causes the pixel image data to be transferred to the printhead for printing. On completion of the instruction the address of the pixel image data is incremented to the next line of pixel data.

"Do not print" enables blank regions to be included in the printout. The instruction includes a variable value, which describes the number of blank lines. This variable is loaded into a counter register. Each time the clock ticks (indicating a new print line) the counter decrements. When the counter decrements to zero, the instruction pointer increments to the next instruction.

"Assert a control signal" to the external environment allows an external controlling computer to ascertain when an image has been printed and when the PHC is ready to receive additional image information. This allows for images to contain components that change.

"Respond to an external control signal" each instruction stored in memory will have status flags associated with it. These flags may be set by an external controlling computer or by the current status of the print head controller and its accompanying printhead. This will allow for multiple PHCs to be synchronized. One use of this mechanism will be in the management of double buffered memory regions. If a small part of an image needs to change with each printout, then an external system needs to be able to synchronize changes to that part of memory such that the image is printed correctly with the overlay. Since the digital press will be operating at high speed and there may be many of these overlay regions on the digital press it may be difficult to achieve this in real time. This invention includes control mechanisms such that an external system can modify regions of memory and the memory region will be managed in a way that allows for changes to be made in synchrony with operations of the digital press of which it forms one element.

"Change the instruction address" allows the system to conditionally change the sequence of instructions being performed depending on external states. Similarly unconditional changes to instruction addresses can be made. These branching operations allows the system to cope with a number of external situations such as "out of paper", "image data not uploaded yet" and unconditional branching allows us to support repeatable sequences.

"Change the address accessed in PHC memory" allows the system to manage images and parts of images in many different ways. An image can be printed repeatedly, once or can be incorporated into another image.

"Change the block of PHC memory" provides for bank-switching memory regions for instructions and data. This allows multiple regions of memory to be maintained. This allows for regions to be modified while other regions are being used for printing.

While an image is being printed additional images may be uploaded ready or printing. This way multiple images may be preloaded to the PHC ready for printing. The benefit is that there is no delay between print runs.

An example program to print sheets of labels:
start:
  skip 10 lines
  print 300 lines from address 0
  skip 5 lines
  print 300 lines from address 0
  skip 5 lines
  print 300 lines from address 0
  skip 5 lines
  print 300 lines from address 0
  skip 10 lines
  go to start:

The example program will print four rows of labels on a sheet. Each label will be three hundred lines high. There will be a gap of five lines between labels. There will be top and bottom margins that are ten lines high.

By way of example, FIGS. 8–15 show the internal operations of a print head controller performing a small set of operations. The controller's memory contents are shown in the RAM BUFFER. PRINT HEAD shows the current contents of the print head ready to print. PRINTOUT describes the physical print out generated by the print head.

The diagrams show the contents of the RAM BUFFER, and the addresses into the RAM BUFFER of three registers; "Start", "Current", and "End". Start describes where the print buffer starts printing. Current register describes where the print buffer is currently printing. End register describes the end address that is printed from.

During operation, the Current register describes the current printing position. After a print operation the Current register is advanced to the next line of image data to be printed. When the Current register reaches the end register position it does not advance to the next address, instead it is set to the value of the Start register.

This sequence allows the same image in the print head RAM BUFFER to be printed repeatedly.

This invention describes a computer instruction set for use in a print head controller. The instruction set is designed to provide the functional requirements of a printer device that produces high volume printouts of the same or similar image.

This device is designed to be used as a printing element in any kind of printer that is producing output of any kind onto any type, shape or size of substrate that exhibits repeating and or changing patterns.

This device is intended to be use as the control mechanism for a digital press. In summary, the present invention is directed to a control device that can be used to manage an electronically actuated device for the purpose of ejecting liquids onto a substrate in a controlled manner (i.e. a print head). This device is used in parallel with other similar control device also controlling print heads. The operation of more than one of these devices in parallel constitutes a single printer control system. This printer control system is normally managed by an external computer system to cause individual print heads controlled by the print head controllers and operating under the direction of the external computer system to digitally place fluids onto appropriate substrates and at high speed.

The control device uses logical mechanisms to support the operation of print heads in parallel. These mechanisms allow external computer systems to control and manage the printing operation. The mechanisms include means for an external computer system to uniquely address and communicate with a print head controller. The communications include the means to transfer data and or instructions between the external computer system and the addressed print head controller. Such communications may comprise image data used to describe the image to be printed by the printer or it may describe instructions that are used to constrain and describe the printing operations.

The control device communication mechanism allows for print head controllers to be addressed individually or collectively in groups or sub-groups. The composition and organization of print head controllers into groups and sub-groups will be as is appropriate for the operation required.

Each print head control device supports a number of internal registers that can be accessed by the external controlling computer to control, manage and query the operation of these devices. These registers are defined as is appropriate for the management of digital transfers from internal memory storage to drive a physical output device to cause liquids to be ejected.

Each print head control device has its own computer storage that holds digital representations of images for printing. In addition this storage may be used to hold instructions that determines how the print head controller operate in response to external control signals. The instructions that are supported describe a range of operations, controls, conditional instructions as appropriate for the operation of a single printing element in an arrangement of multiple similar or dissimilar other elements. The instruction set of this Printer Reduced Instruction Computing device (PRISC) supports various functions to be described below. These instructions are appropriate for the implementation of Print Head Control device.

A refinement of this device would allow the control logic of this invention to be implemented in silicon as a Printer Reduced Instruction Set Computer. Alternatively this instruction set may be implemented in any other form of logic representation such as a Field Programmable Gate Array (FPGA).

The internal registers support the requirements to maintain counters and limits, defining and constraining how the print head controller will interact and manage a print head. An illustrative set of registers would include those required to define the start and end location in memory storage of an image to be printed. During a print operation a register is used to describe the current position within the memory that the image is being printed from. Together these registers can be used to describe a region of memory that is to be printed. Additional registers can be employed to manage multiple images, counters and to map onto and provide queryable registers that describe the current and previous states of accompanying control logic.

The internal registers are triggered to produce a line of print output in response to a control signal. This control signal is actuated electro-mechanically or it may be actuated under computer control. The internal registers describe the pattern of pixels presented to the print head for printing, and as the print operation continues the registers advance to describe the next line of pixels to print.

The print head controller performs a set of operations much like any other computer program. There is a means that allows the results of the current or previous instructions to vary the next instruction depending upon the print operation and status. Such conditional branch instructions are utilized to define operations required appropriate for a digital press comprising multiple parallel elements. Such instructions cause all printing elements to print only when all printing elements are ready. There is little point in printing an incomplete image, far better to print nothing and save ink.

Digital presses are far more flexible in the management of imagery by virtue of the fact that they are digital. There is a beneficial advantage in using a digital press because it allows for mechanisms to modify images or parts of images as the digital press runs. This invention is directed to mechanisms that allow an external computer to modify print head controller's internal memory contents as the image is being printed. This can be achieved in a number of technical ways and is incorporated into the Printer Reduced Instruction Set in a fashion that is transparent to the operator.

Memory management mechanisms exist that allow multiple and separate control systems to access a region or regions of computer memory in parallel. The Printer Reduced Instruction Set Computer supports conditional branch instructions to facilitate different actions in response to different conditions in the accessibility of a region of shared memory. Such mechanism allows the print head controllers, controlling program to recognize if a region of memory is not up to date and allow the print head controller to respond appropriately.

Many different arrangements of memory and logic can be envisioned one such is where multiple print head control computers are coupled together in synchrony to manage the same or different regions of memory and to drive the same or different print heads. The topology of these arrangements may be varied in this device as is most appropriate for the purpose intended.

Each print head control element is responsible for printing a single line of pixel data. This data is used to control a print head and to cause the print head to eject an equivalent line of fluidic droplets onto a substrate. In this device the arrangements of pixels need not necessarily be a line of pixels but can be any arrangement of pixels as appropriate to the printing requirement.

Each print element is responsible for printing a swathe of print representing a strip through the original image. This swathe is normally aligned very precisely such that each adjacent strip aligns precisely with its neighbors. This device may employ means that allow for strips to overlap thus allowing the strips of output to be digitally stitched together in order to avoid visually unattractive artifacts.

A common defect in print heads is where individual print nozzles become blocked this may cause a very obvious visual defect in the resulting print out. This is a serious problem for digital presses employing many print heads because as the number of print heads increase in the system the statistical likelihood of this problem occurring increases. This device employs means that allow for this effect to be compensated for. The device allows heads to be positioned on a control bar such that the position of the print head on the control bar is electronically controlled. Printheads on this special control bar may be positioned and operated on the digital press such that they printout and compensate for print head nozzles misfiring or not ejecting droplets correctly.

The invention has been described with reference to the preferred embodiment. Modifications and alterations will occur to others upon reading and understanding this detailed specification. It is intended to include all such modifications and alterations in so far as they come within the scope of the appended claims and equivalents thereof. It should also be appreciated that the invention should be defined by the claims and not limited to all or any specific one of the advantages and benefits described herein.

Having thus described the invention, it is now claimed:

1. A digital press comprising:
   plural print heads disposed in an array across a travel path of a substrate to be printed;
   plural print head controllers, each print head controller controlling an associated print head; and
   an external processing system for controlling and managing operation of the plural print head controllers, the processing system storing an image to be printed on to the substrate and rasterizing the image into strips of digital data, each strip being digitally transferred to a separate print head controller
   whereby the associated print head produces high volume printouts of the same or substantially the same image,
   wherein the print heads are disposed in spaced relation across the substrate travel path, and
   wherein the spaced print heads are joined by adjusting members for selectively altering a distance between adjacent print heads.

2. The invention of claim 1 wherein each print head controller includes a memory for storing the strip of digital image data.

3. The invention of claim 2 wherein each print head controller includes plural internal registers for accessing the digital image data stored in the memory.

4. The invention of claim 1 wherein each print head controller includes instructions that coordinate print head controller operation in response to an external signal.

5. The invention of claim 1 further comprising means for coordinating the movement of the associated substrate with the print head controllers.

6. The invention of claim 5 wherein the movement coordinating means includes a digital stepping motor for driving the substrate along the travel path, the digital stepping motor being responsive to a control signal received from the external processing system that simultaneously provides a control signal to the print head controllers.

7. The invention of claim 5 wherein the movement coordinating means includes an encoder that monitors movement of the substrate along the travel path and provides a control signal to the print head controllers.

8. The invention of claim 1 wherein the print head controller is responsible for printing a single line of pixel data.

9. The invention of claim 1 further comprising a dynamic mechanism for selectively realigning the print heads.

10. The invention of claim 9 wherein the dynamic mechanism includes a ram for simultaneously moving a group of print heads.

11. The invention of claim 10 wherein the dynamic mechanism includes a piezo material that varies shape in response to an electrical voltage.

12. The invention of claim 9 further comprising a sensing mechanism for detecting and edge of the substrate and providing a signal to the dynamic mechanism for realigning the print heads in response thereto.

13. The invention of claim 1 wherein the print heads are disposed in pairs of rows to minimize alignment error.

14. The invention of claim 13 wherein the pairs of rows are secured to a common mounting member.

15. A method of controlling a plurality of spaced print heads, wherein the spaced print heads are joined by adjusting members for selectively altering a distance between adjacent print heads comprising the steps of:

rasterizing an image into strips of digital data;

transferring each strip of data to a different print head controller that controls an associated print head;

storing the strip of data in each print head controller;

printing an image where each print head prints a separate strip of the image and coordinating a position of the print heads to form a complete image, and adjusting a position of one or more print heads.

16. The method of claim 15 comprising the further step of detecting an edge of a substrate on which an image is printed, and adjusting a position of one or more print heads in response to the detecting step.

* * * * *